United States Patent
Tristan et al.

(10) Patent No.: US 10,860,829 B2
(45) Date of Patent: Dec. 8, 2020

(54) DATA-PARALLEL PARAMETER ESTIMATION OF THE LATENT DIRICHLET ALLOCATION MODEL BY GREEDY GIBBS SAMPLING

(71) Applicant: Oracle International Corporation, Redwood Shores, CA (US)

(72) Inventors: Jean-Baptiste Tristan, Cambridge, MA (US); Guy Steele, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 952 days.

(21) Appl. No.: 14/599,272

(22) Filed: Jan. 16, 2015

(65) Prior Publication Data
US 2016/0210718 A1 Jul. 21, 2016

(51) Int. Cl.
*G06K 9/00* (2006.01)
*G06F 16/93* (2019.01)

(52) U.S. Cl.
CPC .............. *G06K 9/00* (2013.01); *G06F 16/93* (2019.01); *G06K 9/00442* (2013.01); *G06K 9/00986* (2013.01)

(58) Field of Classification Search
CPC ........... G06N 7/005; G06N 5/02; G06F 17/21
USPC .................................................... 706/15, 45
See application file for complete search history.

(56) References Cited

U.S. PATENT DOCUMENTS

| | | | |
|---|---|---|---|
| 8,484,245 B2 * | 7/2013 | Ha-Thuc | G06F 17/30705 707/749 |
| 9,767,416 B2 | 9/2017 | Tristan | |
| 2009/0192980 A1 | 7/2009 | Beyer | |
| 2012/0095952 A1 * | 4/2012 | Archambeau | G06K 9/6249 706/52 |
| 2012/0117008 A1 | 5/2012 | Xu | |
| 2013/0073387 A1 | 3/2013 | Heath | |
| 2013/0159236 A1 | 6/2013 | Vladislav | |

(Continued)

OTHER PUBLICATIONS

Rosen-Zvi et al., "Learning Author-Topic Models from Text Corpora", 2004 Uncertainty in AI Conference and the 2004 ACM SIGKDD Conference, dated 2010, AMC, 38 pages.

(Continued)

*Primary Examiner* — David R Vincent
(74) *Attorney, Agent, or Firm* — Hickman Palermo Becker Bingham LLP

(57) ABSTRACT

A novel data-parallel algorithm is presented for topic modeling on a highly-parallel hardware architectures. The algorithm is a Markov-Chain Monte Carlo algorithm used to estimate the parameters of the LDA topic model. This algorithm is based on a highly parallel partially-collapsed Gibbs sampler, but replaces a stochastic step that draws from a distribution with an optimization step that computes the mean of the distribution directly and deterministically. This algorithm is correct, it is statistically performant, and it is faster than state-of-the art algorithms because it can exploit the massive amounts of parallelism by processing the algorithm on a highly-parallel architecture, such as a GPU. Furthermore, the partially-collapsed Gibbs sampler converges about as fast as the collapsed Gibbs sampler and identifies solutions that are as good, or even better, as the collapsed Gibbs sampler.

21 Claims, 9 Drawing Sheets

(56) References Cited

U.S. PATENT DOCUMENTS

| | | | |
|---|---|---|---|
| 2014/0129510 A1* | 5/2014 | Vladislav | G06F 17/30011 706/52 |
| 2014/0149433 A1 | 5/2014 | Lakshminarayan | |
| 2014/0181214 A1* | 6/2014 | Price | G06F 9/5066 709/205 |
| 2015/0193535 A1 | 7/2015 | Balmin | |
| 2015/0254021 A1 | 9/2015 | Hu | |
| 2015/0268930 A1 | 9/2015 | Lee | |
| 2016/0224544 A1 | 8/2016 | Tristan et al. | |
| 2016/0224900 A1 | 8/2016 | Steele, Jr. | |
| 2016/0224902 A1 | 8/2016 | Steele, Jr. et al. | |
| 2016/0330144 A1 | 11/2016 | Dymetman | |
| 2016/0350411 A1 | 12/2016 | Tristan et al. | |
| 2017/0039265 A1* | 2/2017 | Steele, Jr. | G06F 17/2705 |
| 2017/0154077 A1* | 6/2017 | Kang | G06F 7/20 |
| 2019/0114319 A1 | 4/2019 | Tristian | |

OTHER PUBLICATIONS

Tristan, U.S. Appl. No. 14/316,186, filed Jun. 26, 2014, Final Office Action, dated May 11, 2017.
Newman et al., "Distributed Algorithms for Topic Models", Journal of Machine Learning Research, dated 2009, 28 pages.
Blei et al., "Latent Dirichlet Allocation" Journal of Machine Learning Research 3, dated 2003, 30 pages.
Celeux et al., "On Stochastic Versions of the EM Algorithm", INRIA, dated Mar. 1995, 25 pages.
Chang et al., "Reading Tea Leaves: How Humans Interpret Topic Models" dated 2009, 9 pages.
Freitas et al., "Bayesian Latent Semantic Analysis of Multimedia Databases" Technical Report, dated Oct. 22, 2001, 36 pages.
Griffiths et al., "Finding Scientific Topics" Colloquium, PNAS, vol. 101, dated Apr. 6, 2004, 8 pages.
Jiang et al., "A Method of Accelerating LDA Program with GPU", 2012 Third International Conference on Networking and Distributed Computing IEEE, 2012, 4 pages.
Asuncion et al., "On Smoothing and Inference for Topic Models", UAI 2009, 8 pages.
Lu et al., "Accelerating Topic Training on a Single Machine", APWeb dated 2013, 12 pages.
Yao et al., "Efficient Methods for Topic Model Inference on Streaming Document Collections", KDD, dated 2009, ACM, 9 pages.
Porteous et al., "Fast Collapsed Gibbs Sampling for Latent Dirichlet Allocation" KDD' dated 2008, ACM, 9 pages.
Smola et al., "An Architecture for Parallel Topic Models" Proceedings of the VLDB Endowment, vol. 3, No. 1, dated 2010, 8 pages.
Wallach et al., "Evaluation Methods for Topic Models" Proceedings of 26th International Conference on Machine Learning Monteral, Canada, dated 2009, 8 pages.
Wallach et al., "Rethinking LDA: Why Priors Matter" dated 2009, 9 pages.
Wang et al., "PLDA: Parallel Latent Dirichlet Allocation for Large-Scale Applications" AAIM, dated 2009, 14 pages.
Yan et al., "Parallel Inference for Latent Dirichlet Allocation on Graphics Processing Units" dated 2009, 9 pages.
Liu et al., "PLDA+:Parallel Latent Dirichlet Allocation with Data Placement and Pipeline Processing", ACM, dated 2011, 18 pages.
Morris, Robert, "Counting Large Numbers of Events in Small Registers", Programming Techniques, AMC, dated Oct. 1978, 3 pages.
Blei et al., "Latent Dirichlet Allocation", Journal of Machine Learning Research 3 (2003) 993-1022, Submitted Feb. 2002; Published Jan. 2003, 30 pages.
D. A. Dawson, "Synchronous and Asynchronous Reversible Markov Systems", Canad. Math. Bull. vol. 17 (5), 1975, 17 pages.
D.P. Landau et al., "Test of parallel updating in Ising model simulation", HAL Id: jpa-00210932, Submitted on Jan. 1, 1989, 5 pages.
Hoffman et al., "Stochastic Variational Inference", Journal of Machine Learning Research 14 (2013) 1303-1347, Submitted Jun. 2012; Published May 2013, 45 pages.
Lebowitz et al., "Statistical Mechanics of Probabilistic Cellular Automata", Journal of Statistical Physics, vol. 59, Nos. 1/2, 1990, 54 pages.
Li et al., "Reducing the Sampling Complexity of Topic Models", ACM, dated Aug. 2014, 10 pages.
A. U. Neumann et al., "Finite size scaling study of dynamical phase transitions in two dimensional models : Ferromagnet, symmetric and non symmetric spin glasses", J. Phys. France 49 (1988), 10 pages.
Miklos, Csuros, "Approximate counting with a oating-point counter", dated 2010, 16 pages.
Yee Whye The et al, "A Collapsed Variational Bayesian Inference Algorithm for Latent Dirichlet Allocation", dated 2007, 8 pages.
Pierre-Yves Louis, "Automates Cellulaires Probabilistes : mesures stationnaires, mesures de Gibbs associees et ergodicite", HAL Id: tel-00002203, Submitted Dec. 26, 2002, 207 pages.
Rauch, Eric, "Discrete, amorphous physical models", for a special issue on the Digital Perspectives workshop, dated Jul. 2001, 22 pages.
Tristan et al., "Efficient Training of LDA on a GPU by Mean-for-Mode Estimation", Proceedings of the 32 nd International Conference on Machine Learning, Lille, France, 2015, 10 pages.
Tristan et al., "Learning Topics with Stochastic Cellular Automata Dynamics", 9 pages.
Vichniac, Grrard Y., "Simulating Physics With Cellular Automata", North-Holland, Amsterdam, Elsevier Science Publishers B.V., dated 1984, 21 pages.
Walker, Alastair J., "An Efficient Method for Generating Discrete Random Variables With General Distributions", dated 1977, 4 pages.
Wikipedia the free encyclopedia, "alias method", https://en.wikipedia.org/wiki/Alias_method, last viewed on Sep. 24, 2015, 2 pages.
Mairesse et al., "Accepted Manuscript", Around probabilistic cellular automata, Theoretical Computer Science, dated Sep. 29, 2014, 48 pages.
Tristan, U.S. Appl. No. 14/316,186, filed May 26, 2014, Advisory Action, dated Aug. 3, 2017.
Tristan, U.S. Appl. No. 14/932,825, filed Nov. 4, 2015, Interview Summary, dated May 3, 2018.
Steele Jr., U.S. Appl. No. 14/821,511, filed Aug. 7, 2015, Interview Summary, dated May 11, 2018.
Brown, U.S. Appl. No. 15/074,248, filed Mar. 18, 2016, Notice of Allowance, dated Apr. 24, 2018.
Tristan, U.S. Appl. No. 14/932,825, filed Nov. 4, 2015, Notice of Allowance, dated Apr. 15, 2019.
Thomas et al., "Bugs: A Program to Perform Bayesian Inference Using Bibs Sampling", Bayesian Statistics 4, dated 1992, pp. 837-842.
Tristan, U.S. Appl. No. 14/316,186, filed Jun. 26, 2014, Notice of Allowance, dated Jul. 22, 2019.
Zhao, Huasha, Jiang, Biye, and Canny, John. "Same But Different: Fast and High-quality Gibbs Parameter Estimation". CoRR, abs/1409.5402, 2014, 10 pages.
Thomas, Andrew, "BUGS a Programto Perform Bayesian Inference Using Gibbs Sampling", Oxford University Press dated 1992, 4 pages.
Marsaglia, George, "A Simple Method for Generating Gamma Variables", ACM Transactions on Mathematical Software, vol. 26, No. dated Sep. 3, 2000, 10 pages.
Tristan, U.S. Appl. No. 14/932,825, filed Nov. 4, 2015, Office Action, dated Nov. 14, 2018.
Dieter, Ahrens "An Alias Method for Sampling from the Normal Distribution", Computing, dated 1989, vol. 42, No. 2-3, p. 159.
Tristan, U.S. Appl. No. 14/932,825, filed Nov. 4, 2015, Office Action, dated Feb. 2, 2018.
Steele, U.S. Appl. No. 14/713,205, filed May 15, 2015, Office Action, dated Mar. 8, 2018.
Steele Jr, U.S. Appl. No. 14/821,511, filed Aug. 7, 2015, Office Action, dated Feb. 9, 2018.

(56) References Cited

OTHER PUBLICATIONS

Steele Jr, U.S. Appl. No. 14/820,169, filed Aug. 6, 2015, Office Action, dated Feb. 27, 2018.
Tristan, U.S. Appl. No. 14/932,825, filed Nov. 4, 2015, Interview Summary, dated Aug. 24, 2018.
Tristan, U.S. Appl. No. 14/932,825, filed Nov. 4, 2015, Final Office Action, dated Jun. 26, 2018.
Steele, Jr., U.S. Appl. No. 14/820,169, filed Aug. 6, 2015, Notice of Allowance, dated Jul. 23, 2018.
Steele Jr., U.S. Appl. No. 14/821,511, filed Aug. 7, 2015, Notice of Allowance, dated Aug. 6, 2018.
U.S. Appl. No. 14/755,312, filed Jun. 30, 2015, Office Action, dated Oct. 3, 2016.

* cited by examiner

FIG. 2

$$p(w, z, \theta, \phi | \alpha, \beta) = \left[\prod_{i=1}^{M}\prod_{j=1}^{N_i} \text{Cat}(w_{ij}|\phi_{z_{ij}}) \text{Cat}(z_{ij}|\theta_i)\right]\left[\prod_{i=1}^{M} \text{Dir}(\theta_i|\alpha)\right]\left[\prod_{i=1}^{K} \text{Dir}(\phi_i|\beta)\right]$$

200

$M$: number of documents
$N_i$: number of words in document $i$
$K$: number of topics
$V$: number of words in the vocabulary
$\alpha$: parameter of the prior for distribution of topics per document
$\beta$: parameter of the prior for distribution of words per topic
$\theta_i$: distribution of topics in document $i$
$\phi_i$: distribution of words in topic $i$
$w_{ij}$: word number $j$ in document $i$
$z_{ij}$: topic assignment for $w_{ij}$

210

TABLE OF SYMBOLS USED TO SPECIFY THE LDA MODEL

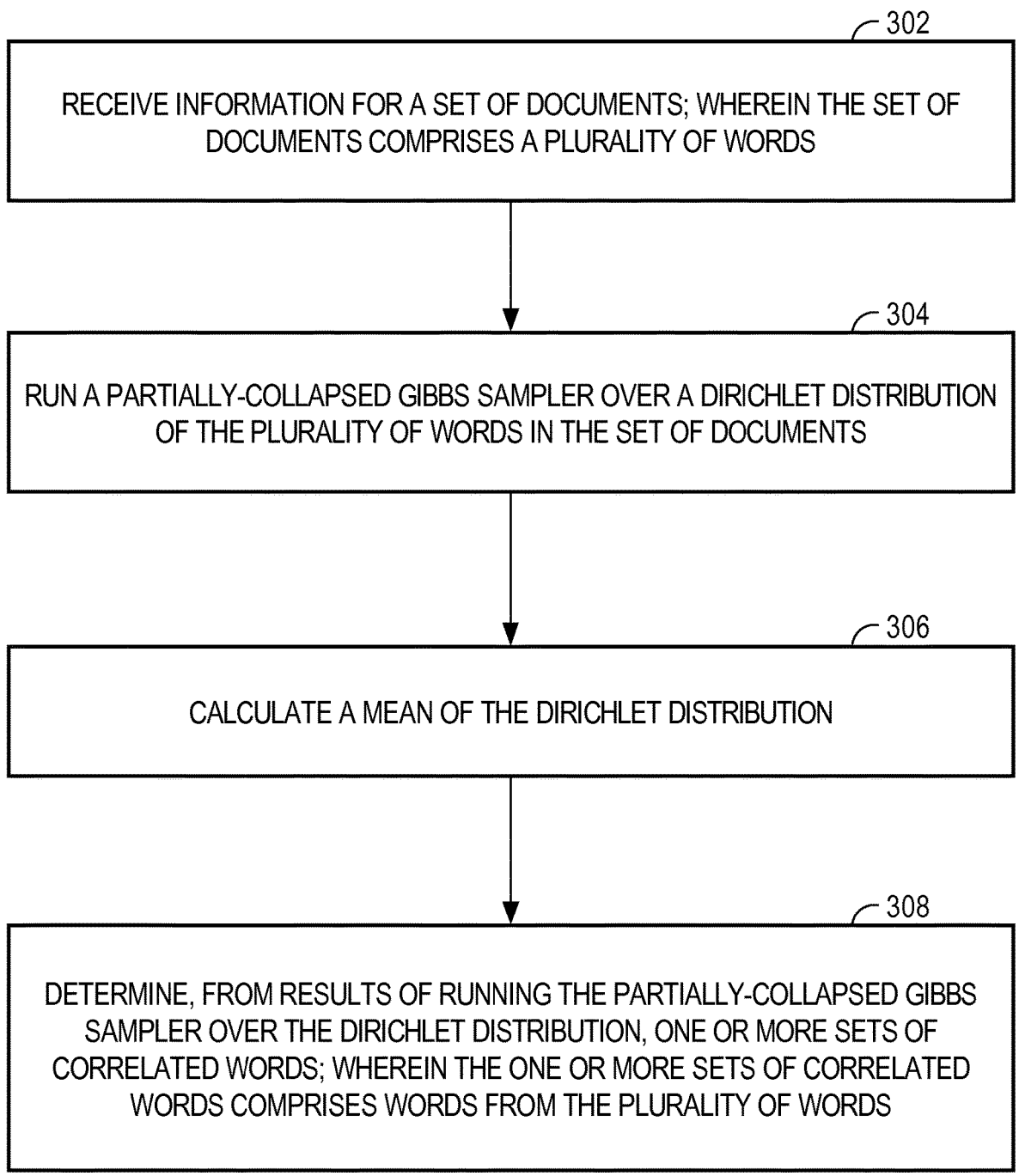

```
Algorithm: High-level description of a Gibbs sampler for a model with random variables
X1 ... XN. p(Xi) refers to the distribution of Xi. The result of sampling from p(Xi) is stored
in X[i]. T is the number of samples.

Randomly initialize array X of size N
for t = 1 to T
    X[1] = sample from p(X1 | X[2], X[3], ... X[N])
    X[2] = sample from p(X2 | X[1], X[3], ... X[N])
    X[3] = sample from p(X3 | X[1], X[2], ... X[N])
    ...
    X[N] = sample from p(XN | X[1], X[2], X[3], ... X[N-1])
return X
```

$$p(z,w|\alpha,\beta) = \int_\theta \int_\phi p(w,z,\theta,\phi|\alpha,\beta)d\phi d\theta$$

$$= \left[\prod_{i=1}^{M} \frac{\Gamma(\sum_{k=1}^{K}\alpha_k)}{\prod_{k=1}^{K}\Gamma(\alpha_k)} \frac{\prod_{k=1}^{K}\Gamma(\mathcal{D}_{ik}+\alpha_k)}{\Gamma(\sum_{k=1}^{K}\mathcal{D}_{ik}+\alpha_k)}\right] \left[\prod_{k=1}^{K} \frac{\Gamma(\sum_{v=1}^{V}\beta_v)}{\prod_{v=1}^{V}\Gamma(\beta_v)} \frac{\prod_{v=1}^{V}\Gamma(\mathcal{W}_{kv}+\beta_v)}{\Gamma(\sum_{v=1}^{V}\mathcal{W}_{kv}+\beta_v)}\right]$$

← 500

| Algorithm: | Equations for the collapsed Gibbs sampler |
|---|---|

$$p(z_{ij}|z^{-ij},\alpha,\beta) \propto (\mathcal{D}_{kj}^{-ij}+\alpha_k)\frac{\mathcal{W}_{w_{ij},k}^{-ij}+\beta_{w_{ij}}}{\sum_{v=1}^{V}\mathcal{W}_{kv}+\beta_v}$$

$$p(\theta_i | w, z, \theta_{-i}, \phi, \alpha, \beta) \propto \text{Dir}(\theta_i | \alpha) \prod_{j=1}^{N_i} \text{Cat}(z_{ij} | \theta_i) \quad \text{—600}$$

$$\propto \text{Dir}(\theta_i | (D_{ik} + \alpha_k : k \in [1..K])) \quad \text{—610}$$

$$p(\phi_k | w, z, \theta, \phi_{-k}, \alpha, \beta) \propto \text{Dir}(\phi_k | \beta) \left[ \prod_{i=1}^{M} \prod_{j=1}^{N_i} \text{Cat}(w_{ij} | \phi_{z_{ij}})^{\mathbb{1}(z_{ij}=k)} \right] \quad \text{—620}$$

$$= \text{Dir}(\phi_k | \beta) \prod_{v=1}^{V} \phi_{kv}^{W_{vk}} \quad \text{—630}$$

$$\propto \text{Dir}(\phi_k | (W_{vk} + \beta_v : v \in [1..V])) \quad \text{—640}$$

---
Algorithm: Gibbs sampler
---

$$p(\phi_k | w, z, \theta, \phi_{-k}, \alpha, \beta) \propto \text{Dir}(\phi_k | (W_{vk} + \beta_v : v \in [1..V])) \quad \text{—652}$$

$$p(\theta_i | w, z, \theta_{-i}, \phi, \alpha, \beta) \propto \text{Dir}(\theta_i | (D_{ik} + \alpha_k : k \in [1..K])) \quad \text{—654}$$

$$p(z_{ij} = t | w, z_{-ij}, \theta, \phi, \alpha, \beta) \propto \text{Cat}(w_{ij} | \phi_{z_{ij}}) \, \text{Cat}(z_t | \theta_i) \quad \text{—656}$$

---

$$p(w, z, \phi | \alpha, \beta) = \left[ \prod_{i=1}^{M} \frac{\Gamma(\sum_{k=1}^{K} \alpha_k) \prod_{k=1}^{K} \Gamma(\mathcal{D}_{ik} + \alpha_k)}{\prod_{k=1}^{K} \Gamma(\alpha_k) \Gamma(\sum_{k=1}^{K} \mathcal{D}_{ik} + \alpha_k)} \right] \left[ \prod_{i=1}^{M} \prod_{j=1}^{N_i} \mathrm{Cat}(w_{ij} | \phi_{z_{ij}}) \right] \left[ \prod_{k=1}^{K} \mathrm{Dir}(\phi_k | \beta) \right]$$

← 700

| Algorithm: | Gibbs sampler with $\theta$ collapsed |
|---|---|

$$p(\phi_k | w, z, \phi_{-k}, \alpha, \beta) \propto \mathrm{Dir}(\phi_k | \{\mathcal{W}_{vk} + \beta_v : v \in [1..V]\}) \quad \leftarrow 712$$

$$p(z_{ij} = t | z_{-ij}, \phi, w, \alpha, \beta) \propto (\mathcal{D}_{it}^{-z_{ij}} + \alpha_t) \, \mathrm{Cat}(w_{ij} | \phi_{z_{ij}})$$

← 710

(714 points to the dashed box around the Dir expression)

FIG. 8

| Algorithm: | Greedy Gibbs sampler |

$$p(\phi_{kv}|w, z, \phi_{-k}, \alpha, \beta) \propto \dfrac{W_{vk} + \beta_v}{\sum_{v=1}^{V} W_{kv} + \beta_v} \quad \leftarrow 810$$

$$p_k(z_{tj} = t|z_{-tj}, \phi, w, \alpha, \beta) \propto (D_{tj}^{-z_{ij}} + \alpha_t) \, \text{Cat}(w_{tj}|\phi_{zi}) \quad \leftarrow 820$$

812 (callout to boxed fraction)

800

DATA-PARALLEL PARAMETER ESTIMATION OF THE LATENT DIRICHLET ALLOCATION MODEL BY GREEDY GIBBS SAMPLING

FIELD OF THE INVENTION

The present invention relates to sampling from a statistical model, and, more specifically, to sampling from a latent Dirichlet allocation (LDA) model using a partially-collapsed Gibbs sampler.

BACKGROUND

Machine learning facilitates complex, statistics-based computations such as natural language processing, image recognition, retrieving information from unorganized text, etc. Machine learning involves implementing an inference procedure, such as Gibbs sampling, on a statistical model, such as a latent Dirichlet allocation (LDA) model. Gibbs sampling is used to identify values for parameters, i.e., $\theta$ and $\Phi$, that best explain the data presented in a particular LDA model.

Doing inference on probabilistic programs is computationally intensive, and the amount of data being analyzed via inference code is often voluminous such that a large amount of computation power is required to process the data. In the context of Gibbs sampling, a fully-collapsed Gibbs sampler can be used to efficiently identify parameter values in that a fully-collapsed Gibbs sampler identifies parameter values with a relatively small number of iterations. However, processing of a fully-collapsed Gibbs sampler is sequential, and is not efficiently implemented on highly parallel architectures, such as a graphics processing unit (GPU).

Some attempts to run a fully-collapsed Gibbs sampler on a GPU have involved making some approximations for the sampler to extract parallelism. However, making such approximations is sub-optimal because making these approximations does not create enough parallelism to make effective use of the parallel structure of a GPU. Furthermore, making these approximations requires replicating the phi matrix, which is prohibitively expensive on a GPU because of the logistics of storing many copies of this large matrix.

A normal, or pristine, Gibbs sampler (with no collapsed variables) inherently includes a high level of parallelism. However, a normal Gibbs sampler is very slow to converge to a solution, i.e., it takes many iterations to find good parameter values to explain given data. Also, solutions found by using a normal Gibbs sampler are not as good as solutions found by a collapsed Gibbs sampler.

Therefore, it would be beneficial to develop inference algorithms that have enough inherent parallelism to make use of highly parallel architectures, and that also identify good solutions for parameters to explain data in a particular model.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 depicts a density function that describes a Latent Dirichlet Allocation model (LDA).

FIG. 3 depicts a flowchart for identifying sets of correlated words from a given set of documents.

FIG. 5 depicts a model and equations for a collapsed Gibbs sampler.

FIG. 6 depicts a derivation of the Gibbs equations for pristine LDA, and Gibbs sampler equations for pristine LDA.

FIG. 7 depicts a derivation of the Gibbs equations for a partially-collapsed LDA, and Gibbs sampler equations for the partially-collapsed LDA.

FIG. 8 depicts greedy Gibbs sampler equations.

DETAILED DESCRIPTION

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

A novel data-parallel algorithm is presented for topic modeling on highly-parallel hardware architectures. The algorithm is a Markov-Chain Monte Carlo algorithm used to estimate the parameters of the LDA topic model. This algorithm is based on a highly parallel partially-collapsed Gibbs sampler, but replaces a stochastic step that draws from a distribution with an optimization step that computes the mean of the distribution directly and deterministically. This algorithm is correct, it is statistically performant, and it is faster than state-of-the art algorithms because it can exploit the massive amounts of parallelism by processing the algorithm on a highly-parallel architecture, such as a GPU. Furthermore, the partially-collapsed Gibbs sampler converges about as fast as the collapsed Gibbs sampler and identifies solutions that are as good, or even better, as the collapsed Gibbs sampler.

Architecture for Highly-Parallel Model Sampling

Figure 1:
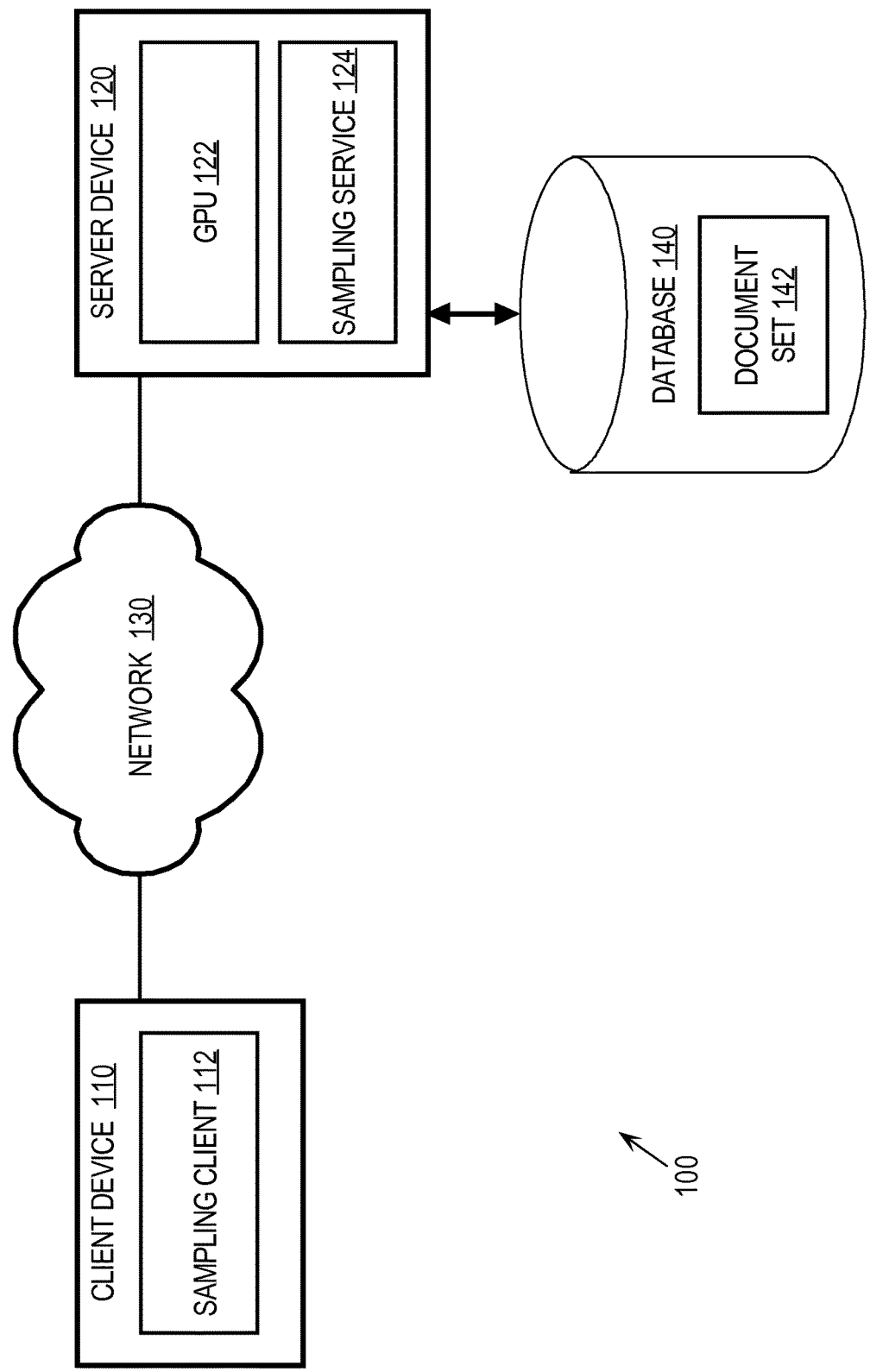
FIG. 1 is a block diagram that depicts an example network arrangement for a highly-parallel model sampling system.

FIG. 1 is a block diagram that depicts an example network arrangement 100 for a highly-parallel model sampling system, according to embodiments. Network arrangement 100 includes a client device 110 and a server device 120 communicatively coupled via a network 130. Example network arrangement 100 may include other devices, including client devices, server devices, and display devices, according to embodiments.

Client device 110 may be implemented by any type of computing device that is communicatively connected to network 130. Example implementations of client device 110 include, without limitation, workstations, personal computers, laptop computers, personal digital assistants (PDAs), tablet computers, cellular telephony devices such as smart phones, and any other type of computing device.

In network arrangement 100, client device 110 is configured with a sampling client 112. Sampling client 112 may be implemented in any number of ways, including as a stand-alone application running on client device 110, as a plugin to a browser running at client device 110, etc. Sampling client 112 may be implemented by one or more logical modules. Client device 110 may be configured with other mechanisms, processes and functionalities, depending upon a particular implementation.

Network 130 may be implemented with any type of medium and/or mechanism that facilitates the exchange of information between client device 110 and server device 120. Furthermore, network 130 may facilitate use of any type of communications protocol, and may be secured or unsecured, depending upon the requirements of a particular embodiment.

Server device 120 may be implemented by any type of computing device that is capable of communicating with client device 110 over network 130. In network arrangement 100, server device 120 is configured with a GPU 122. Any of the functionality attributed to GPU 122 herein may be performed by another entity running on server device 120, or by a GPU or other hardware on client device 110 or on other devices that are communicatively coupled to network 130, according to embodiments. Server device 120 is further configured with a sampling service 124, which is described in further detail below. Server device 120 is also communicatively coupled to a database 140. Server device 120 may be configured with other mechanisms, hardware, processes, and functionalities, depending upon a particular implementation.

Server device 120 is communicatively coupled to database 140. Database 140 maintains information for a document set 142. Database 140 may reside in any type of storage, including volatile and non-volatile storage (e.g., random access memory (RAM), a removable or disk drive, main memory, etc.), and may be implemented by one or more logical databases. The storage on which database 140 resides may be external or internal to server device 120.

Sampling client 112 and/or sampling service 124 may receive and respond to Application Programming Interface (API) calls, Simple Object Access Protocol (SOAP) messages, requests via HyperText Transfer Protocol (HTTP), HyperText Transfer Protocol Secure (HTTPS), Simple Mail Transfer Protocol (SMTP), or any other kind of communication, e.g., from other entities communicatively coupled to network 130. Further, sampling client 112 and/or sampling service 124 may send one or more communications, using any of the above protocols or any other communication protocol, over network 130 to one of the other entities communicatively coupled to network 130, according to embodiments.

In an embodiment, each of the processes described in connection with sampling client 112, GPU 122, and/or sampling service 124 are performed automatically and may be implemented using one or more computer programs, other software or hardware elements, and/or digital logic in any of a general-purpose computer or a special-purpose computer, while performing data retrieval, transformation, and storage operations that involve interacting with and transforming the physical state of memory of the computer.

Topic Models

A topic model is a probabilistic model for a set of textual documents designed with the underlying assumption that words belong to sets of topics, where a topic is a set of words. For example, given a set of scientific papers, a topic model can be used to discover words that occur together (and therefore form a topic). One topic could include words such as "neuroscience" and "synapse", while another topic could contain words such as "graviton" and "boson".

Topic models have many applications in natural language processing. For example, topic modeling can be a key part of text analytics methods such as Name Entity Recognition, Part-of-Speech Tagging, or search. Unfortunately, topic modeling is computationally expensive, and it is often applied on significant amounts of data, sometimes under time constraints.

Given the considerable computational potential of latest editions of Graphics Processor Units (GPU), and their potential for even more computational power, it is tempting to run topic modeling tasks on the GPU. However, GPUs are composed of many Single Program Multiple Data (SPMD) units and, as such, expose a computational model that is very different from processors and multicores. Thus, algorithms that work well on ordinary CPUs are generally re-designed to be data-parallel for GPUs.

Described herein is a data-parallel algorithm that is also a Markov-Chain Monte Carlo algorithm. This algorithm automatically estimates topics, i.e., in an unsupervised fashion, by estimating the parameters of the most popular topic model: Latent Dirichlet Allocation.

Latent Dirichlet Allocation

The Latent Dirichlet Allocation model (LDA) can be described by density function 200 of FIG. 2. The variables are described in table 210 of FIG. 2. Herein, a vector of random variables, such as all of the $\theta_i$, is referred to as $\theta$.

Intuitively, the model described by density function 200 describes how a corpus, represented as a vector of words w, could be randomly generated. The process works as follows.

First, to generate M documents, M distributions of topics are drawn, one per document ($\Pi_{i=1}^{M}\mathrm{Dir}(\theta_i|\alpha)$). Such a distribution is denoted by the random variable $\theta_i$. To generate documents out of K topics, $\theta_i$ will be a vector of size K.

Second, K distributions of words are drawn, one per topic ($\Pi_{i=1}^{K}\mathrm{Dir}(\Phi_i|\beta)$). Such a distribution is denoted by the random variable $\Phi_k$. Assuming our vocabulary is of size V, $\Phi_k$ will be a vector of size V. Note that the random vectors $\theta_i$ and $\Phi_k$ are drawn from Dirichlet distributions for mathematical convenience.

Finally, for each word in each document, a topic for the word is drawn (using $\theta_i$). Then, given this topic choice, a word is drawn (using $\Phi_k$) from the corresponding topic distribution ($\Pi_{i=1}^{M}\Pi_{j=1}^{N_i}\mathrm{Cat}(w_{ij}|\Phi_{z_{ij}})\mathrm{Cat}(z_{ij}|\theta_i)$).

A valuable application of topic modeling, rather than generating random documents, is, given a set of documents (which may be represented as a ragged array or equivalently as a at vector of words along with an array N that gives the length of each document), estimating the probabilities of each of the $\theta_i$ and $\Phi_k$ conditioned on the given data. More precisely, $\theta$ and $\Phi$ are estimated in the following optimization problem:

$$\underset{\theta,\Phi}{\mathrm{argmax}}\, p(\theta, \Phi | w)$$

That is, a value for $\theta$ and $\Phi$ are found that maximize the probability of the given words. Computing the exact maximum is computationally intractable, so approximate algorithms are used to identify these values.

As such, flowchart 300 of FIG. 3 depicts a method for identifying sets of correlated words from a given set of documents. At step 302, information is received for a set of documents, i.e., document set 142 (database 140), where the set of documents comprises a plurality of words. For example, a user provides information about document set 142 to sampling client 112 (client device 110). In this example, document set 142 is a set of web pages gathered by a web crawler. Sampling client 112 provides the information to sampling service 124 (server device 120). According to an embodiment, a user also provides sampling service 124 a number of topics (K) into which the Gibbs sampler should correlate the words from document set 142.

Herein, algorithms to solve the problem of identifying values for $\theta$ and $\Phi$ are described using the following notations.

Number of occurrences of topic t in document i:

$$D_{it} = |\{z_{ij} : j\delta[1 \ldots N_i], z_{ij} = t\}|$$

Number of times word v is assigned to topic t:

$$W_{vt} = |\{w_{ij} : \epsilon[1 \ldots M], j\epsilon[1 \ldots N_i], w_{ij} = v \land z_{ij} = t\}|$$

Number of times topic t is assigned to any word:

$$W_t = \sum_v W_{vt}$$

Gibbs Sampling

Markov Chain Monte Carlo (MCMC) algorithms are used to estimate the parameters. The idea is that even though the closed form of $p(\theta, \Phi|w)$ is not known, samples can still be drawn from it, proportionally to their likelihood, and so the most likely samples that are found can be kept as estimates of $\Phi$ and $\theta$. There are many ways to build algorithms to sample from $p(\theta, \Phi|w)$, but for LDA it is customary to use a specific class of algorithms called Gibbs samplers.

Figure 4:
FIG. 4 depicts a high-level description of a Gibbs sampler for a model with random variables.

Gibbs samplers work by drawing samples one variable at a time, as described in algorithm 400 of FIG. 4. To derive a Gibbs sampler, one must therefore be able to sample from the conditional distributions $p(X_i|\text{all other variables of the model})$ for each random variable $X_i$ in the model. The definitions of these conditional distributions are referred to herein as the Gibbs equations, and knowledge of the Gibbs equations is all that is needed to implement a Gibbs sampler using algorithm 400. Once the Gibbs sampler has drawn from each variable of the model conditioned on the other variables, the individual samples can be combined into a sample for the entire model, and the process iterates as many times as samples are required.

A key idea to build a parallel Gibbs sampler is to note that if two variables are independent in the model, then they will not depend on each other for their corresponding Gibbs equations and they can therefore be sampled in parallel.

The samples obtained using the MCMC algorithm are specific value assignments for all the vectors $\theta_i$ and $\theta_k$, and for each sample, the quality of algorithm can be evaluated by computing some metric over these values. Typically, the first few samples that are obtained will have a very low probability because the algorithm is started with an arbitrary assignment. Consequently, the algorithm iterates to "converge" to samples that explain the data better. There are two meaningful measures to assess the "speed" of an MCMC algorithm: the time to converge and the time to sample. Herein, notations are used as follows:

Sample: refers not to a sample from one of the conditional distributions, but rather to the sample for all variables that are obtained after a full iteration of algorithm 400.

Time to convergence: refers to the number of samples that are needed to find "good" assignments for $\theta$ and for $\Phi$.

Time to sample: refers to the time it takes to draw a sample.

The tradeoffs between time-to-convergence and time-to-sample can be delicate. As an example, note that there is no point in speeding up the time-to-sample by two if it takes four times more samples to obtain a good assignment for $\theta$ and $\Phi$.

Gibbs Sampler Overview

The standard way of building a Gibbs sampler for LDA is to build a collapsed Gibbs sampler. Such a sampler has a high statistical quality, but has the big disadvantage that it is a sequential algorithm. Prior research on parallel parameter estimation for LDA has been focused on parallelizing the collapsed Gibbs sampler by making approximations. However, even though such an approximation works well for an architecture with coarse-grained parallelism, it does not lend itself to a good data-parallel algorithm for the GPU. Adapting to the GPU computational model can result in overall better algorithms.

A first idea to design good a data-parallel sampler for LDA is to define a pristine (non-collapsed) Gibbs sampler. The key idea in using such a sampler is to use the fact that because variables have not been collapsed, many variables are independent from each other, and as such, they can be sampled in parallel. Such a sampler would be highly data-parallel, but it is known to have a lesser statistical quality. Another problem with such a sampler is that it requires to draw from a Dirichlet distribution. Consequently, it may not be adequate to use single-precision units, which is a significant problem for current GPUs since they usually have many more single-precision units than double precision.

An improvement would be to use a partially-collapsed Gibbs sampler. It would still offer a large amount of parallelism and it would have a better statistical quality than a pristine Gibbs sampler, but it would still not be quite as good as a collapsed Gibbs sampler.

Embodiments herein comprise a modification of a partially-collapsed Gibbs sampler that, instead of drawing from some probability distribution to estimate the topics, directly computes the mean of the distribution. Such an algorithm has the same amount of parallelism as the pristine Gibbs sampler, and a statistical quality similar to that of the collapsed Gibbs sampler. Single precision floating-point arithmetic is adequate for such an algorithm because the algorithm does not draw from a Dirichlet distribution. Finally, this algorithm requires less computation than a pristine Gibbs sampler.

Fully-Collapsed Gibbs Sampler

The most popular MCMC for LDA takes advantage of the fact that the integration of variables $\theta$ and $\Phi$ has a closed form solution. Therefore, a new model 500 of FIG. 5 is defined by integrating these variables, from which will be derived a Gibbs sampler.

Gibbs equations (algorithm 510 of FIG. 5) can be derived for that model, which leads to the first presented MCMC algorithm to find parameters for LDA. A key thing to note here is that drawing a given $z_{ij}$ depends on the assignments to all the other z variables, so they are updated sequentially. This results from the integration. Such integration results in a model that is simpler to sample from, but this sampling has no intrinsic parallelism.

This sampler is the most commonly used because it has a very good convergence, and all known previous work on parallelizing MCMC for LDA builds on top of this algorithm. Even though it is possible to parallelize this algorithm, the parallelization is coarse and not effective to make use of a GPU.

Normal Gibbs Sampler

If one chooses not to integrate the θ and Φ variables, then there will be more independent variables and consequently more parallelism in the Gibbs sampler.

First is reviewed the derivation of the Gibbs equations for pristine LDA. The derivations for variables $\theta_i$ and $z_{ij}$ are straightforward, and indicated in equations 600-640 of FIG. 6 and algorithm 650 of FIG. 6.

Equations 652 and 654, of algorithm 650, identify values for parameters Φ and θ, respectively. These equations represent discovery of the parameters for the given Dirichlet distributions, and drawing values from the Dirichlet distributions.

The key advantage of algorithm 650 is the very large amount of parallelism it offers. However, it is known to have a worse convergence rate, and it has a worse statistical performance than the collapsed Gibbs sampler. In experimental evaluation, this folklore knowledge is confirmed.

Gibbs Sampler with Only θ Collapsed

Returning to flowchart 300 of FIG. 3, at step 304, a partially-collapsed Gibbs sampler is run over a Dirichlet distribution of the plurality of words in the set of documents. For example, sampling service 124 runs a partially-collapsed Gibbs sampler over a Dirichlet distribution of the plurality of words in document set 142.

Some of the benefits of the fully-collapsed Gibbs sampler can be achieved while retaining a lot of independent variables by integrating only the θ variables, as shown in equation 700 and algorithm 710 of FIG. 7. This causes the z variables for any single document to depend on each other, but z variables belonging to different documents remain independent.

Algorithm 710 forms the basis of the algorithm presented herein. As such, a complete derivation of the Gibbs sampler for this model is included in annex A.

Algorithm 710 has less parallelism than a normal Gibbs sampler, but it still has enough for a GPU implementation since all of the documents can be worked on in parallel. The integration of the 8 variables improves the convergence rate and the statistical performance; however, these are not quite as good as the convergence rate and the statistical performance of the collapsed Gibbs sampler.

Greedy Gibbs Sampler for Data-Parallel LDA

Algorithm 800 of FIG. 8 represents an algorithm that has enough parallelism to be run on a GPU, and yet that has convergence close to the one of the fully-collapsed Gibbs sampler, and a statistical performance as good as the one of the fully-collapsed Gibbs sampler.

Algorithm 710, the Gibbs sampler with 8 integrated out, forms the basis of algorithm 800. The key difference with algorithm 650 is that, instead of drawing from some Dirichlet distribution d, the mean of d is directly computed via approximation 812 of equation 810 (FIG. 8). In other words, equation 810 replaces a non-deterministic draw from a Dirichlet distribution d (as shown in equation 712 (FIG. 7) at Dirichlet distribution draw 714), with a deterministic value calculation of the mean of Dirichlet distribution d. In this manner, the deterministic value calculation of the mean of Dirichlet distribution d is a substitute value for a value draw from the Dirichlet distribution d in algorithm 800.

Again returning to flowchart 300 of FIG. 3, at step 306, a mean of the Dirichlet distribution is calculated. More specifically, a mean of the Dirichlet distribution is calculated as part of running a partially-collapsed Gibbs sampler over a Dirichlet distribution of the plurality of words in the set of documents. To illustrate, sampling service 124 runs algorithm 800 on the Dirichlet distribution of the plurality of words in document set 142. As stated, approximation 812 in algorithm 800 replaces a value draw from the Dirichlet distribution of the plurality of words in document set 142 with a deterministic value calculation of the mean of the Dirichlet distribution.

At step 308 of flowchart 300, one or more sets of correlated words are determined from results of running the partially-collapsed Gibbs sampler over the Dirichlet distribution, wherein the one or more sets of correlated words comprises words from the plurality of words. Continuing with the previous example, sampling service 124 continues to run algorithm 800 over the data in document set 142 until a satisfactory level of convergence is detected. A satisfactory level of convergence may be detected based on one or more of: a number of iterations of algorithm 800, the likelihood of the parameters does not increase significantly anymore, the perplexity of the parameters does not decrease anymore, etc.

Once convergence is reached, sampling service 124 has, through algorithm 800, assigned each word of the plurality of words in document set 142 a particular topic. According to an embodiment, the plurality of words is less than all of the words in the documents of document set 142. According to an embodiment, the plurality of words is all of the words in the documents of document set 142. Sampling service 124 returns, to sampling client 112, information for lists of correlated words identified from document set 142.

According to an embodiment, the sets of correlated words are not automatically associated with topic names, interpretations of the identified correlations, etc. The word groupings are simply based on correlations detected in the given set of documents. For example, sampling service 124 identifies a correlation between two words based on the inclusion of the two words together in a single document of document set 142. In a similar vein, sampling service 124 identifies a strong correlation between the two words based on the inclusion of the two words together in a multiple documents. As a further example, sampling service 124 identifies a strong correlation between the two words based on the inclusion of two words together in the same sentence in one or more documents.

Parameter values identified using a partially-collapsed Gibbs sampler are as good, or even better, than solutions identified using a fully-collapsed Gibbs sampler. Directly computing the mean of Dirichlet distribution d allows production of as good or better solutions than a fully-collapsed Gibbs sampler in less iterations. Furthermore, because the algorithm includes parallelism, the algorithm may be efficiently run on a GPU. By using parallelism, the time of each iteration of algorithm 800 is made faster. The value replacement means that fewer iterations of algorithm 800 is required for convergence.

Single-Precision Floating Point Arithmetic

Also note that one of the consequences of replacing drawing from a Dirichlet distribution with the computation of its mean is that single-precision floating-point arithmetic may be used to perform the computations. This is an advantage because drawing from a Dirichlet distribution generally requires double-precision arithmetic. One reason for using double-precision arithmetic when drawing from a Dirichlet distribution is exponent range rather than precision as such; drawing from a Dirichlet distribution induces drawing from a Gamma distribution and for small, yet reasonable, values of α or β the probability of drawing a number smaller than the smallest representable single-precision number is significant.

To further illustrate, algorithm 710 depicts drawing from a Dirichlet distribution at Dirichlet distribution draw 714.

According to an embodiment, when drawing from a Dirichlet distribution is implemented (i.e., in software), the implementation draws from a Gamma distribution. Drawing from a Gamma distribution may require double-precision arithmetic.

In contrast with algorithm 710, algorithm 800 depicts approximation 812 instead of a Dirichlet distribution draw like Dirichlet distribution draw 714. Approximation 812 is implemented (i.e., in software) using a mathematical computation on numerical quantities, which is a deterministic computation that does not require drawing from a Gamma distribution and can be performed using single-precision arithmetic. Furthermore, the removal of the need for drawing from a Gamma distribution results in less time needed to perform the calculations for a single iteration of the Gibbs sampler.

Implementation in Parallel

Furthermore, because of the removal of the need to draw from a Gamma distribution, single-precision arithmetic is sufficient to implement algorithm 800. This allows a greater range of hardware (i.e., hardware with one or both of single-precision units and double-precision units) to be used to perform the calculations for algorithm 800. For example, current GPUs, which usually have many more single-precision units than double precision, may be used to perform the calculations for the Gibbs sampler of algorithm 800. Using a GPU to perform the calculations results in faster convergence because calculations for each document of document set 142 may be performed in parallel, thus taking advantage of the high level of parallelism in the GPU architecture.

Algorithm 800 affords more parallelism than a fully-collapsed Gibbs sampler (illustrated in algorithm 510 of FIG. 5) but less than a pristine Gibbs sampler (illustrated in algorithm 650 of FIG. 6). Specifically, equation 810 calculates $\Phi_{kv}$. Based on equation 810, during a particular iteration of the Gibbs sampler of algorithm 800, sampling service 124 calculates a value for each $\Phi_{kv}$ in parallel before moving on to equation 820.

Equation 820 calculates the topic assignment for each word in document set 142, as represented by $z_{ij}$ (where i refers to the document and j refers to the word in the document), based in part on $\Phi$ (as the $\Phi$ values stand after the calculations of equation 810 in the current iteration) and the number of times a topic was assigned in document j other than for $z_{ij}$ (i.e., represented by $D_{it}^{-z_{ij}}$) As such, in algorithm 800, topic assignments for the words in a particular document are done sequentially since equation 820 requires information about all other topic assignments in document j. However, topic assignments for each document in document set 142 may be processed in parallel, since equation 820 does not require information from any other document in the set other than document j (i.e., the document currently being analyzed). Therefore, in the context of a GPU such as GPU 122, a particular SPMD unit of GPU 122 processes calculations specific to a particular document in document set 142 during any given iteration of algorithm 800.

Once sampling service 124 finishes the calculations for equation 820, sampling service 124 performs another iteration of algorithm 800, starting back at equation 810, based on the assignments calculated for the z variables in connection with the latest iteration of equation 820. Iterations are continued until good assignments for the z variables are found (aka, convergence is detected).

According to another embodiment, the Gibbs sampler is collapsed with respect to $\Phi$ rather than $\theta$ (algorithm 800 illustrates an embodiment where $\theta$ is collapsed). In the embodiment where $\Phi$ is collapsed, calculations for each word in a set of documents are performed in parallel.

Pseudocode of Greedy Gibbs Sampler for LDA

In the following pseudocode that illustrates implementation of algorithm 800: M is the number of documents; it is assumed that all documents have the same size N; K is the number of topics; V is the size of the vocabulary; and M, N, K, and V are all assumed to be strictly positive.

The data to be analyzed, e.g., document set 142, is represented in the matrix "words". The "topics" matrix and "phis" matrix are matrices used to store the result of sampling from the conditional distributions. The matrices "topics_per_doc", "words_per_topic", and "words_total", are used to keep track of statistics about the samples. "topics_per_doc" is a matrix used to count the number of times a topic was assigned to a latent variable in each document. "words_per_doc" is a matrix used to count the number of times a word is assigned to some topic. "words_total" is an array used to count how many times each topic was assigned. These matrices respectively correspond to the notations $D_{ik}$, $W_{kv}$, $W_k$.

```
int[M,N] words
int[M,N] topics
double phis[K,V]
int topics_per_doc[M,K]
int words_per_topic[K,V]
int words_total[K]
```

The following function "sampler" is the main function that returns an assignment for the phi variables. After initialization, it samples T times, in turn, all the latent variables by calling "draw_z" and the phis by calling the procedure "estimate". It is assumed that the "topics" matrix is given initialized with a random assignment of topics.

```
function sampler (int T) {
    initialize ( )
    estimate ( )
    for i = 0 to T
        set words_per_topic to 0
        set words_total to 0
        draw_z ( )
        estimate ( )
    return phis
}
```

The procedure "estimate" computes an assignment for each phi based on the current statistics for the latent variable. Each cell of the matrix "phis" can be computed in parallel.

```
procedure estimate ( ) {
    for v = 0 to V - 1 in parallel
        for i = 0 to K - 1 in parallel
            float num = words_per_topic[i][v] + beta
            float den = words_total[i] + V * beta
            phis[i][v] = num / den
}
```

The procedure "initialize" computes the statistics for "topics_per_doc" which relates to the thetas that have been integrated.

```
procedure initialize ( ) {
    for m = 0 to M - 1 in parallel
        for i = 0 to N - 1 in parallel
```

```
        topics_per_doc[m][z[m][i]]++
}
```

The procedure "draw_z" draws values for the latent variables on each document in parallel. For each document, it goes over each word in sequence (because of the integration), computes the probability for every possible topic, and finally draws a value for the latent variable. Finally, the statistics are updated. Note that this update is different for variables that have been integrated and those that have not.

```
procedure draw_z ( )
{
    for m = 0 to M - 1 in parallel
        float p[K]
        for i = 0 to N - 1
            float sum = 0;
            int current_word = words[m][i]
            int current_topic = topics[m][i]
            for ( int j = 0; j < K; j++)
                float p_w = phis[j][current_word]
                float p_z = topics_per_doc[m][i]
                    - (j == current_topic ? 1 : 0)
                sum += p_w * (p_z + alpha)
                p[j] = sum
            float u = random ( )
            float stop = u * sum ;
            int j;
            for j = 0 to K - 1 if (stop < p[j]) break
            topics[m][i] = j
            atomically increment
                words_per_topics[j][current_word]
            atomically increment words_total[j]
            topics_per_doc[m][j]++
            topics_per_doc[m][current_topic]--
}
```

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
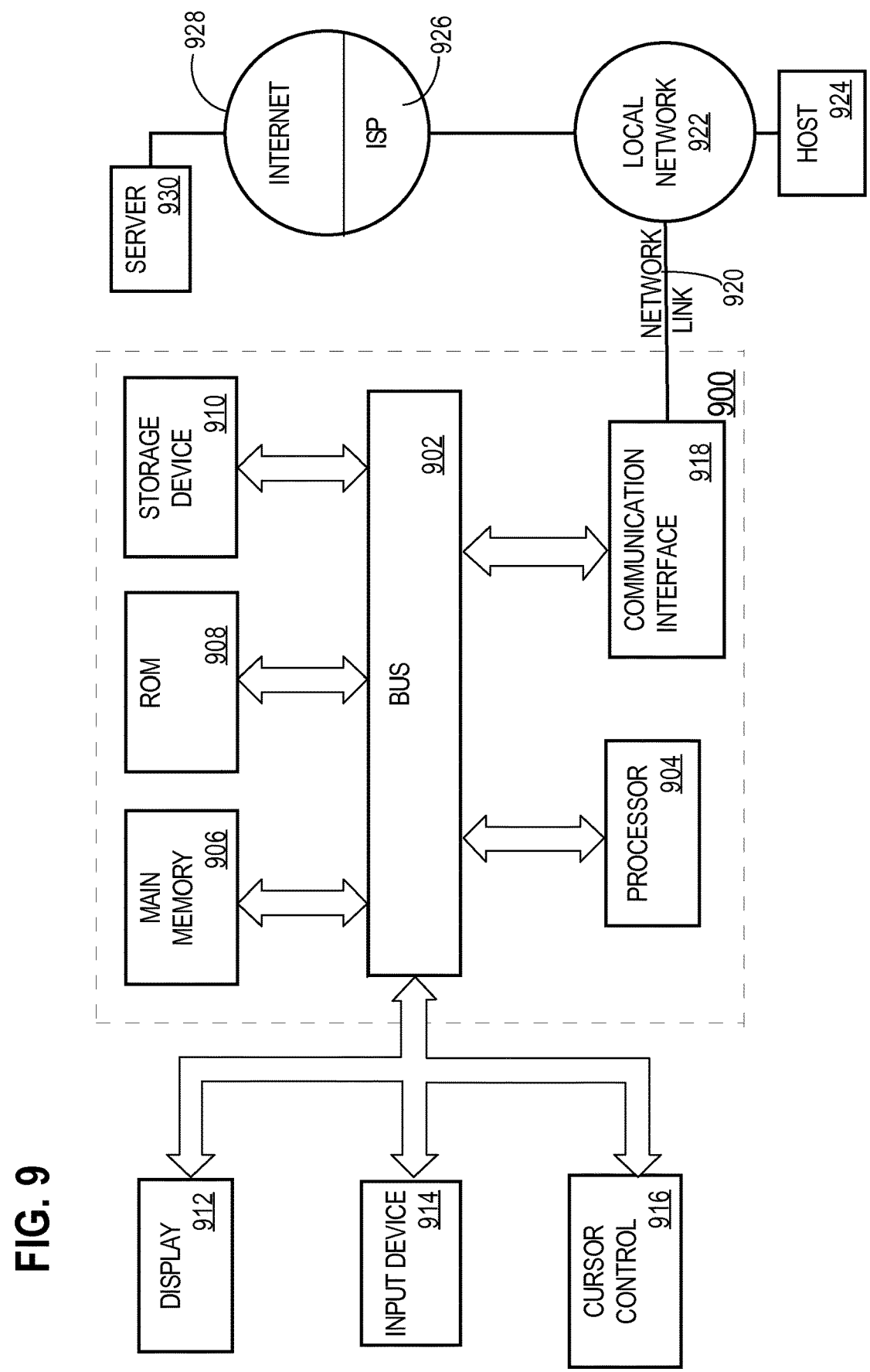
FIG. 9 is a block diagram of a computer system on which embodiments may be implemented.

For example, FIG. 9 is a block diagram that illustrates a computer system 900 upon which an embodiment may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   generating a topic model that identifies sets of correlated words by:
   receiving information for a plurality of documents;
   wherein the plurality of documents comprises a plurality of words;
   running a partially-collapsed Gibbs sampler over one or more Dirichlet distributions of the plurality of words in the plurality of documents to produce sampler result data, further comprising:
      calculating one or more mean values of the one or more Dirichlet distributions via single precision arithmetic; and
   wherein calculations for running the partially-collapsed Gibbs sampler for a particular document of the plurality of documents is performed, on a graphics processing unit (GPU), in parallel with calculations for running the partially-collapsed Gibbs sampler for other documents of the plurality of documents;
   determining, from the sampler result data, one or more sets of correlated words;
   wherein the topic model comprises the one or more sets of correlated words; and
   analyzing text within one or more documents, other than the plurality of documents, based at least in part on the topic model;
   wherein the method is performed by one or more computing devices.

2. The method of claim 1, wherein running the partially-collapsed Gibbs sampler over a particular Dirichlet distribution, of the one or more Dirichlet distributions further comprises calculating a particular mean of the particular Dirichlet distribution as a substitute value for drawing a value from the particular Dirichlet distribution.

3. The method of claim 1, further comprising calculating the one or more mean values of the one or more Dirichlet distributions, via using single-precision arithmetic, in a plurality of Single Program Multiple Data (SPMD) units of the GPU.

4. The method of claim 1, wherein running the partially-collapsed Gibbs sampler over the one or more Dirichlet distributions comprises computing, in parallel and based on a first set of assignments of topics for the plurality of words in the plurality of documents, a second set of assignments of topics for a plurality of vocabulary words in a vocabulary.

5. The method of claim 4, further comprising:
   computing, for each topic of a plurality of topics, a topic-specific Dirichlet distribution based, at least in part, on the first set of assignments of topics for the plurality of words and the second set of assignments of topics for the plurality of vocabulary words; and
   in parallel for each vocabulary word of the plurality of vocabulary words, and for each topic of the plurality of topics, estimating a probability of said each vocabulary word being assigned to said each topic by computing a topic-specific mean of the topic-specific Dirichlet distribution for said each topic.

6. The method of claim 1, wherein said performing calculations for running the partially-collapsed Gibbs sampler for the particular document of the plurality of documents comprises, in sequence for each word of the particular document:
   computing a plurality of topic probabilities, for said each word, in sequence; and
   drawing a topic assignment for said each word based, at least in part, on the plurality of topic probabilities.

7. The method of claim 1, wherein:
   said receiving information for the plurality of documents comprises receiving the plurality of documents at the one or more computing devices;
   said analyzing text within one or more documents, other than the plurality of documents, based at least in part on the topic model produces text analysis data; and the method further comprises storing said text analysis data in one or more non-transitory computer readable media.

8. One or more non-transitory computer-readable media storing instructions that, when executed by one or more processors, cause:
  generating a topic model that identifies sets of correlated words by:
    receiving information for a plurality of documents;
    wherein the plurality of documents comprises a plurality of words;
    running a partially-collapsed Gibbs sampler over one or more Dirichlet distributions of the plurality of words in the plurality of documents to produce sampler result data, further comprising:
      calculating one or more mean values of the one or more Dirichlet distributions via single precision arithmetic; and
      wherein calculations for running the partially-collapsed Gibbs sampler for a particular document of the plurality of documents is performed, on a graphics processing unit (GPU), in parallel with calculations for running the partially-collapsed Gibbs sampler for other documents of the plurality of documents;
    determining, from the sampler result data, one or more sets of correlated words;
  wherein the topic model comprises the one or more sets of correlated words; and
  analyzing text within one or more documents, other than the plurality of documents, based at least in part on the topic model.

9. The one or more non-transitory computer-readable media of claim 8, wherein running the partially-collapsed Gibbs sampler over a particular Dirichlet distribution, of the one or more Dirichlet distributions further comprises calculating a particular mean of the particular Dirichlet distribution as a substitute value for drawing a value from the particular Dirichlet distribution.

10. The one or more non-transitory computer-readable media of claim 8, the instructions further comprise instructions that, when executed by one or more processors, cause calculating the one or more mean values of the one or more Dirichlet distributions, via single-precision arithmetic, in a plurality of Single Program Multiple Data (SPMD) units of the GPU.

11. The one or more non-transitory computer-readable media of claim 8, wherein running the partially-collapsed Gibbs sampler over the one or more Dirichlet distributions comprises computing, in parallel and based on a first set of assignments of topics for the plurality of words in the plurality of documents, a second set of assignments of topics for a plurality of vocabulary words in a vocabulary.

12. The one or more non-transitory computer-readable media of claim 11, wherein the instructions further comprise instructions that, when executed by one or more processors, cause:
  computing, for each topic of a plurality of topics, a topic-specific Dirichlet distribution based, at least in part, on the first set of assignments of topics for the plurality of words and the second set of assignments of topics for the plurality of vocabulary words; and
  in parallel for each vocabulary word of the plurality of vocabulary words, and for each topic of the plurality of topics, estimating a probability of said each vocabulary word being assigned to said each topic by computing a topic-specific mean of the topic-specific Dirichlet distribution for said each topic.

13. The one or more non-transitory computer-readable media of claim 8, wherein said performing calculations for running the partially-collapsed Gibbs sampler for the particular document of the plurality of documents comprises, in sequence for each word of the particular document:
  computing a plurality of topic probabilities, for said each word, in sequence; and
  drawing a topic assignment for said each word based, at least in part, on the plurality of topic probabilities.

14. The one or more non-transitory computer-readable media of claim 8, wherein:
  said receiving information for the plurality of documents comprises receiving the plurality of documents at one or more computing devices;
  said analyzing text within one or more documents, other than the plurality of documents, based at least in part on the topic model produces text analysis data; and
  the instructions further comprise instructions that, when executed by one or more processors, cause storing said text analysis data in particular one or more non-transitory computer readable media.

15. A computer system comprising:
  one or more processors; and
  wherein a particular GPU processor of the one or more processors is a graphics processing unit (GPU);
  one or more non-transitory computer-readable media storing instructions that, when executed by the one or more processors, cause:
    generating a topic model that identifies sets of correlated words by:
      receiving information for a plurality of documents;
      wherein the plurality of documents comprises a plurality of words;
      running a partially-collapsed Gibbs sampler over one or more Dirichlet distributions of the plurality of words in the plurality of documents to produce sampler result data, further comprising:
        calculating one or more mean values of the one or more Dirichlet distributions via single precision arithmetic; and
        wherein calculations for running the partially-collapsed Gibbs sampler for a particular document of the plurality of documents is performed, on the particular GPU processor, in parallel with calculations for running the partially-collapsed Gibbs sampler for other documents of the plurality of documents;
      determining, from the sampler result data, one or more sets of correlated words:
    wherein the topic model comprises the one or more sets of correlated words; and
    analyzing text within one or more documents, other than the plurality of documents, based at least in part on the topic model.

16. The computer system of claim 15, wherein running the partially-collapsed Gibbs sampler over a particular Dirichlet distribution, of the one or more Dirichlet distributions further comprises calculating a particular mean of the particular Dirichlet distribution as a substitute value for drawing a value from the particular Dirichlet distribution.

17. The computer system of claim 15, wherein:
  the particular GPU processor comprises a plurality of Single Program Multiple Data (SPMD) units;
  the instructions further comprise instructions that, when executed by one or more processors, cause calculating the one or more mean values of the one or more Dirichlet distributions, via single-precision arithmetic, in the plurality of SPMD units of the particular GPU processor.

18. The computer system of claim 15, wherein a running the partially-collapsed Gibbs sampler over the one or more Dirichlet distributions comprises computing, in parallel and based on a first set of assignments of topics for the plurality of words in the plurality of documents, a second set of assignments of topics for a plurality of vocabulary words in a vocabulary.

19. The computer system of claim 18, wherein the instructions further comprise instructions that, when executed by one or more processors, cause:
   computing, for each topic of a plurality of topics, a topic-specific Dirichlet distribution based, at least in part, on the first set of assignments of topics for the plurality of words and the second set of assignments of topics for the plurality of vocabulary words; and
   in parallel for each vocabulary word of the plurality of vocabulary words, and for each topic of the plurality of topics, estimating a probability of said each vocabulary word being assigned to said each topic by computing a topic-specific mean of the topic-specific Dirichlet distribution for said each topic.

20. The computer system of claim 15, wherein said performing calculations for running the partially-collapsed Gibbs sampler for the particular document of the plurality of documents comprises, in sequence for each word of the particular document:
   computing a plurality of topic probabilities, for said each word, in sequence; and
   drawing a topic assignment for said each word based, at least in part, on the plurality of topic probabilities.

21. The computer system of claim 15, wherein:
   said receiving information for the plurality of documents comprises receiving the plurality of documents at one or more computing devices;
   said analyzing text within one or more documents, other than the plurality of documents, based at least in part on the topic model produces text analysis data; and
   the instructions further comprise instructions that, when executed by one or more processors, cause storing said text analysis data in particular one or more non-transitory computer readable media.

* * * * *

UNITED STATES PATENT AND TRADEMARK OFFICE
CERTIFICATE OF CORRECTION

PATENT NO. : 10,860,829 B2
APPLICATION NO. : 14/599272
DATED : December 8, 2020
INVENTOR(S) : Tristan et al.

Page 1 of 2

It is certified that error appears in the above-identified patent and that said Letters Patent is hereby corrected as shown below:

On the Title Page

On page 2, Column 1, under Other Publications, Line 30, delete "Monteral," and insert -- Montreal, --, therefor.

On page 2, Column 2, under Other Publications, Line 13, delete "oating-point" and insert -- floating-point --, therefor.

In the Specification

In Column 5, Line 13, delete "$\{z_{ij}:j\delta[1$" and insert -- $\{z_{ij}:j\epsilon[1$ --, therefor.

In Column 5, Line 15, delete "$\{w_{ij}:\epsilon[1$" and insert -- $\{w_{ij}:i\epsilon[1$ --, therefor.

In Column 5, Line 51, delete "$\theta_k$," and insert -- $\Phi_k$, --, therefor.

In Column 7, Line 39, delete "8" and insert -- $\theta$ --, therefor.

In Column 7, Line 49, delete "8" and insert -- $\theta$ --, therefor.

In Column 9, Line 46, delete "$D_{it}^{-zij})$" and insert -- $D_{it}^{-z_{ij}})$. --, therefor.

In Column 11, Line 21, delete "( int j" and insert -- (int j --, therefor.

In the Claims

In Column 14, Line 25, in Claim 2, delete "distributions" and insert -- distributions, --, therefor.

In Column 14, Line 31, in Claim 3, after "via" delete "using".

Signed and Sealed this
First Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,860,829 B2

In Column 15, Line 35, in Claim 9, delete "distributions" and insert -- distributions, --, therefor.

In Column 16, Line 50, in Claim 15, delete "words:" and insert -- words; --, therefor.

In Column 16, Line 58, in Claim 16, delete "distributions" and insert -- distributions, --, therefor.

In Column 17, Line 4, in Claim 18, after "wherein" delete "a".